United States Patent
Okada et al.

(10) Patent No.: US 11,268,594 B2
(45) Date of Patent: Mar. 8, 2022

(54) REDUCTION GEAR

(71) Applicant: KOBE STEEL, LTD., Hyogo (JP)

(72) Inventors: Toru Okada, Kobe (JP); Kazuo Yamaguchi, Takasago (JP); Keita Kanai, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 192 days.

(21) Appl. No.: 16/755,735

(22) PCT Filed: Oct. 4, 2018

(86) PCT No.: PCT/JP2018/037180
§ 371 (c)(1),
(2) Date: Apr. 13, 2020

(87) PCT Pub. No.: WO2019/078018
PCT Pub. Date: Apr. 25, 2019

(65) Prior Publication Data
US 2020/0332861 A1  Oct. 22, 2020

(30) Foreign Application Priority Data

Oct. 17, 2017 (JP) .............................. JP2017-200903

(51) Int. Cl.
*F16H 3/089* (2006.01)
*G01B 21/22* (2006.01)
*F16C 19/52* (2006.01)

(52) U.S. Cl.
CPC ............. *F16H 3/089* (2013.01); *G01B 21/22* (2013.01); *F16C 19/527* (2013.01)

(58) Field of Classification Search
None
See application file for complete search history.

(56) References Cited

U.S. PATENT DOCUMENTS 5,697,868 A * 12/1997 Akeel ...................... F16H 1/32
475/179
2002/0160875 A1* 10/2002 Kanazawa .............. F16H 48/22
475/248

FOREIGN PATENT DOCUMENTS

JP  2010-159826 A  7/2010

* cited by examiner

*Primary Examiner* — Raul J Rios Russo
*Assistant Examiner* — Carl F. R. Tchatchouang
(74) *Attorney, Agent, or Firm* — Studebaker & Brackett PC

(57) ABSTRACT

Provided is a reduction gear comprising a bearing state detection device capable of detecting the state of a rolling bearing that rotates integrally with an output shaft and an output gear during power transmission. The bearing state detection device comprises: a plurality of displacement sensors (1, 2, 11, 12), which are disposed in mutually differing positions at the sides of output gears (26, 27) having helical threads (35a, 37a) formed in the outer peripheral surfaces, and which detect the amount of axial displacement of the side surfaces of the output gears; and a processing unit (5), which determines the amount of tilt of the gears (26, 27) on the basis of the amount of displacement detected by the plurality of displacement sensors (1, 2, 11, 12) during rotation of the output gears (26, 27) when the output gears are linked to an output shaft (25) by a linking mechanism (32).

8 Claims, 8 Drawing Sheets

F I G. 1
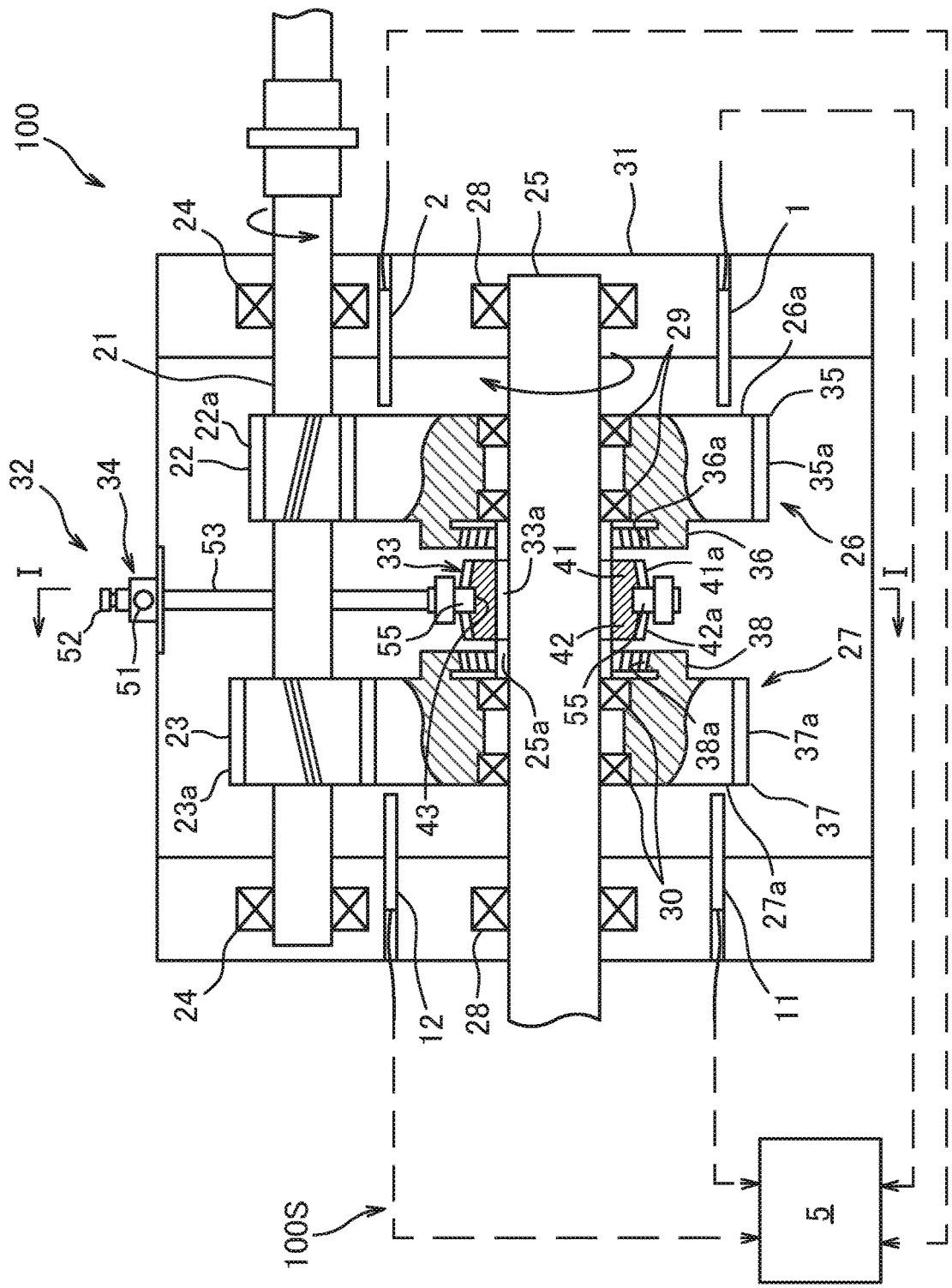

REDUCTION GEAR

TECHNICAL FIELD

The present disclosure relates to a reduction gear equipped with a detection device that detects the state of a rolling bearing provided on an output shaft.

BACKGROUND ART

As a reduction gear for a kneader extruder that kneads and extrudes a resin, rubber, and the like, a two-speed switching reduction gear described in Patent Document 1, for example, is known. The rotation speed of the rotor of the kneader extruder is switched between high-speed condition and low-speed condition by the two-speed switching reduction gear, and thus the throughput, kneading temperature, and kneading quality of a kneaded product are adjusted.

The two-speed switching reduction gear includes an input shaft having an outer-circumferential face to which a low-speed side pinion and a high-speed side pinion are fixed, an output shaft that is disposed in parallel with the input shaft, and a rotation speed switching mechanism. On the output shaft, a low-speed side gear that engages with the low-speed side pinion and a high-speed side gear that engages with the high-speed side pinion are each idlably mounted through a bearing. The rotation speed switching mechanism selectively links the low-speed side gear and the high-speed side gear with the output shaft.

In the case in which the low-speed side gear is linked with the output shaft, the rotation (power) of the input shaft is transmitted to the output shaft through the low-speed side pinion and the low-speed side gear, and as a result, the output shaft rotates at low speed. On the other hand, in the case in which the high-speed side gear is linked with the output shaft, the rotation (power) of the input shaft is transmitted to the output shaft through the high-speed side pinion and the high-speed side gear, and as a result, the output shaft rotates at high speed. Note that in both cases, in the low-speed side gear and the high-speed side gear, the gear that is not linked with the output shaft idles about the rotating output shaft at a rotation speed different from the rotation speed of the output shaft.

CITATION LIST

Patent Document

Patent Document 1: JP 2010-159826 A

SUMMARY OF THE INVENTION

Here, the bearing between the low-speed side gear and the output shaft and the bearing between the high-speed side gear and the output shaft are both rotate integrally with the output shaft and the gears in the transmission of power. Thus, no relative velocity is produced between an inner ring and an outer ring that constitute the bearing. Since no relative velocity is produced between the inner ring and the outer ring, a rolling element of the bearing keeps in contact with the inner ring and the outer ring at the same places in the state in which a load is applied. To these contact places, mechanical vibrations are applied, and damage that is referred to as fretting corrosion (surface damage (wear) that occurs due to relative micro motion repeatedly acting on two contacting surfaces in a periodic manner) is produced and developed in a lapse of time.

As the abnormality diagnosis of a bearing, it is known that generally, vibrations of the bearing housing (the inner ring and the outer ring) are measured, vibrations at a frequency (a bearing damage frequency) due to an inner ring scratch or an outer ring scratch are monitored, and thus the presence or absence of an abnormality in the bearing is determined.

However, in the two-speed switching reduction gear having a structure as described in Patent Document 1, since the bearing is located in the inside of the gear (the low-speed side gear and the high-speed side gear), it is difficult to measure vibrations of the bearing. Since the inner ring and the outer ring of the bearing do not relatively rotate in the transmission of power, no bearing damage frequency for use in abnormality determination appears, and thus the above-described general abnormality diagnosis method for a bearing is not applicable. Therefore, in order to diagnose an abnormality in a bearing, it has been desired to establish a bearing state detection method that is different from conventional methods.

The present disclosure has been made in view of the circumstances. An object is to provide a reduction gear equipped with a bearing state detection device that can detect the state of a rolling bearing rotating integrally with an output shaft and an output gear in the transmission of power.

The reduction gear includes a casing, an input shaft that is rotatably supported on the casing, at least one input gear that is fixed to the input shaft, and that rotates together with the input shaft, an output shaft that is rotatably supported on the casing such that the output shaft is disposed in parallel with the input shaft, at least one rolling bearing including an inner ring that is fixed to the output shaft and an outer ring that is relatively rotatable to the inner ring, at least one output gear that is fixed to the outer ring of the at least one rolling bearing and that engages with the at least one input gear, a linking mechanism that is switchable between a linking state in which the at least one rolling bearing is bypassed such that the at least one output gear and the output shaft integrally rotate and the at least one output gear is linked with the output shaft and a releasing state in which a link between the at least one output gear and the output shaft is released, and a detection device that detects a state of the at least one rolling bearing. The at least one input gear includes an input-gear outer circumferential part on which helical threads are formed, the at least one output gear includes an output-gear outer circumferential part on which helical threads that engage with the helical threads of the input-gear outer circumferential part are formed, and an output-gear side surface that is orthogonal to an axial direction of the output shaft, and the detection device includes a plurality of displacement sensors that are opposed to the output-gear side surface of the at least one output gear at a position at a predetermined distance from a rotation axis of the output shaft in a radial direction, and that detect a displacement of the output-gear side surface in the axial direction, and a processing unit that acquires a tilt amount to the rotation axis of the output-gear side surface based on the displacements of the output-gear side surface detected by the plurality of displacement sensors in rotation of the output gear which is linked with the output shaft by the linking mechanism, and that detects a state of the rolling bearing from the tilt amount.

BRIEF DESCRIPTION OF DRAWINGS

FIG. 1 is a plane cross-sectional view illustrating a reduction gear according to an embodiment of the present disclosure.

FIG. 5A is a view schematically illustrating a clearance δ between a race and a rolling element of a rolling bearing produced due to wear or the like.

DESCRIPTION OF EMBODIMENTS

Figure 2:
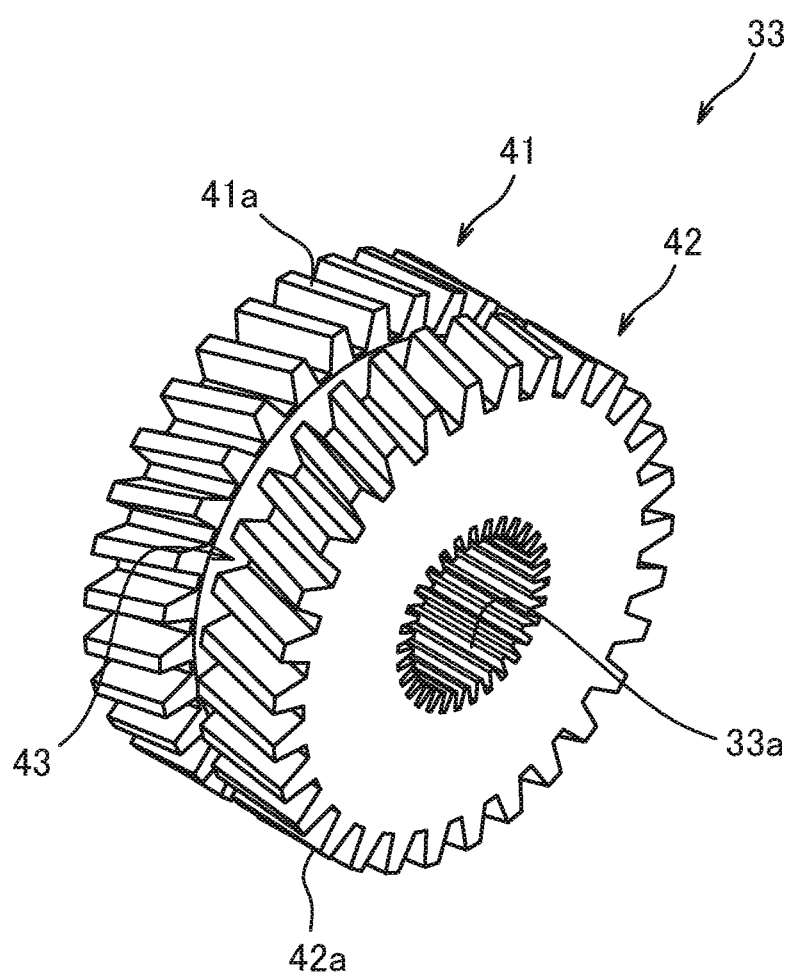
FIG. 2 is a perspective view illustrating a clutch gear of a linking mechanism of the reduction gear according to an embodiment of the present disclosure.

Hereinafter, embodiments that embody the present disclosure will be described with reference to the drawings. In the following description, as a reduction gear to which a bearing state detection device according to the present disclosure is applied, a two-speed switching reduction gear is taken as an example. This two-speed switching reduction gear is a reduction gear for use in a kneader extruder that kneads and extrudes a resin, rubber, or the like, for example. Note that the bearing state detection device according to the present disclosure is not limited to the two-speed switching reduction gear, which is also applicable to reduction gears having no speed switching mechanism.

First, the configuration and operation of a two-speed switching reduction gear shown as an example of an application target will be described, to which the bearing state detection device according to the present disclosure is applied. FIG. 1 is a plane cross-sectional view illustrating a two-speed switching reduction gear 100 according to the present embodiment.

Configuration of Two-speed Switching Reduction Gear

As illustrated in FIG. 1, the two-speed switching reduction gear 100 includes a casing 31, an input shaft 21 having a low-speed side pinion 22 and a high-speed side pinion 23, and an output shaft 25 that is disposed in parallel with the input shaft 21. The input shaft 21 and the output shaft 25 are rotatably supported on the casing 31. The low-speed side pinion 22 (an input gear, a low-speed side input gear) and the high-speed side pinion 23 (an input gear, a high-speed side input gear) are fixed to the input shaft 21, and rotate together with the input shaft 21. On the output shaft 25, a low-speed side gear 26 (an output gear, a low-speed side output gear) that engages with the low-speed side pinion 22 and a high-speed side gear 27 (an output gear, a high-speed side output gear) that engages with the high-speed side pinion 23 are idlably mounted through pairs of rolling bearings 29 and 30.

The pair of the rolling bearings 29 (30) are disposed on the inner side of the low-speed side gear 26 (the high-speed side gear 27) and between the low-speed side gear 26 (the high-speed side gear 27) and the output shaft 25. That is, the pair of the rolling bearings 29 (30) both include an inner ring that is fixed to the output shaft 25 and an outer ring that is relatively rotatable to the inner ring. The low-speed side gear 26 (the high-speed side gear 27) is fixed to the outer rings of the rolling bearings 29 (30).

The input shaft 21 is rotatably supported on a bearing 24 that is fixed to the casing 31, and the output shaft 25 is rotatably supported on a bearing 28 that is fixed to the casing 31. Note that the input shaft 21 is rotated by a drive unit, such an electric motor, not illustrated in the drawing.

Here, the low-speed side pinion 22 is a helical gear, and the high-speed side pinion 23 is a helical gear having a diameter greater than the diameter of the low-speed side pinion 22. Specifically, the low-speed side pinion 22 includes an outer circumferential part 22a (an input-gear outer circumferential part) on which helical threads are formed, and the high-speed side pinion 23 includes an outer circumferential part 23a (an input-gear outer circumferential part) on which helical threads are formed. The number of teeth of the high-speed side pinion 23 is greater than the number of teeth of the low-speed side pinion 22.

Note that the low-speed side pinion 22 and the high-speed side pinion 23, i.e., these pinion gears (22 and 23), and the input shaft 21 may be a one-component product formed by cutting, for example, one material, or may be components that are separately formed and then fixed to each other by press-fitting the pinion gears (22 and 23) to the input shaft 21, for example.

On the other hand, on the outer-circumferential face (the output-gear outer circumferential part) of the low-speed side gear 26, helical threads 35a that engage with the low-speed side pinion 22 are formed, and on the outer-circumferential face (the output-gear outer circumferential part) of the high-speed side gear 27, helical threads 37a that engage with the high-speed side pinion 23 are formed. The outer diameter of the low-speed side gear 26 is greater than the outer diameter of the high-speed side gear 27. The number of teeth of the low-speed side gear 26 is greater than the number of teeth of the high-speed side gear 27. The low-speed side gear 26 has a side surface 26a (an output-gear side surface) that is orthogonal to the axial direction of the output shaft 25, and the high-speed side gear 27 has a side surface 27a (an output-gear side surface) that is orthogonal to the axial direction of the output shaft 25.

Figure 3:
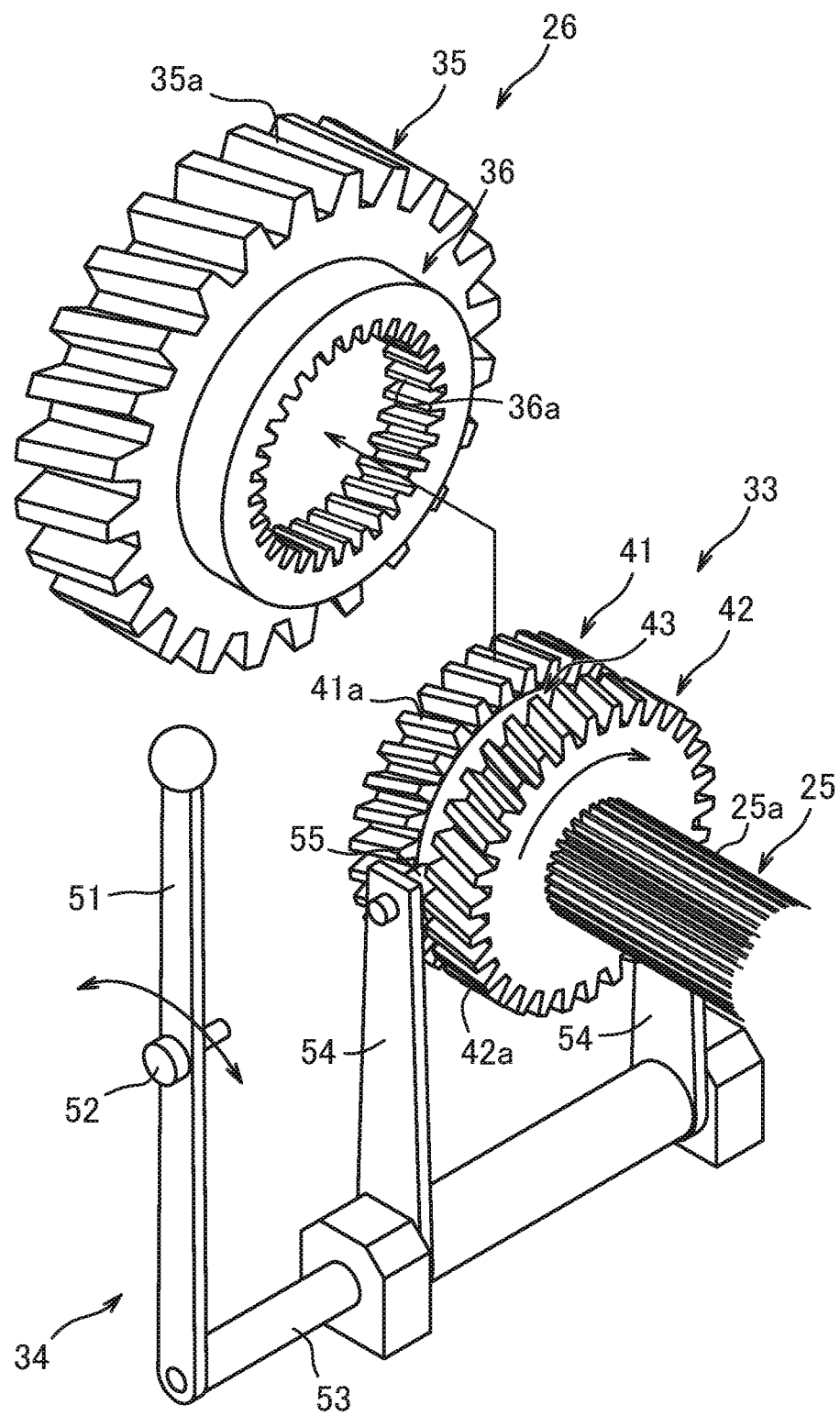
FIG. 3 is a perspective view illustrating the linking mechanism according to an embodiment of the present disclosure.

Note that the outer diameters of the gears of the low-speed side pinion 22, the high-speed side pinion 23, the low-speed side gear 26, and the high-speed side gear 27 are the same along their axial directions, and as illustrated in the low-speed side pinion 22 and the high-speed side pinion 23 in FIG. 1 and the low-speed side gear 26 in FIG. 3, gear teeth formed on their outer-circumferential faces are tilted along a rotation direction.

Figure 4:
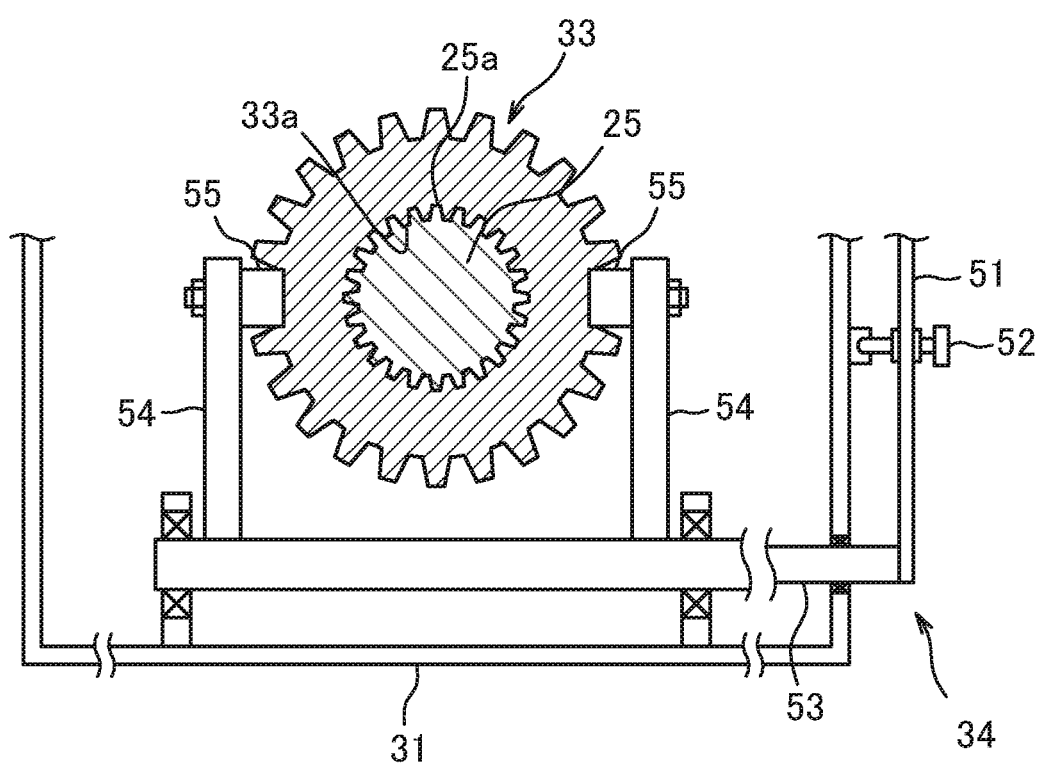
FIG. 4 is a cross sectional view illustrating the linking mechanism taken along line I-I in FIG. 1.

The two-speed switching reduction gear 100 includes a rotation speed switching mechanism 32 as a linking mechanism that selectively links the low-speed side gear 26 and the high-speed side gear 27 with the output shaft 25. FIG. 2 is a perspective view of a clutch gear 33 of the rotation speed switching mechanism 32 of the two-speed switching reduction gear 100 according to the present embodiment. FIG. 3 is a perspective view of the rotation speed switching mechanism 32. FIG. 4 is a cross sectional view of the rotation speed switching mechanism 32 taken along I-I in FIG. 1. The rotation speed switching mechanism 32 is switchable between a linking state in which the bearings 29 are bypassed such that the low-speed side gear 26 and the output shaft 25 integrally rotate and the low-speed side gear 26 is linked with the output shaft 25, and a releasing state in which the link between the low-speed side gear 26 and the output shaft 25 is released. The rotation speed switching mechanism 32 is switchable between a linking state in which the bearings 30 are bypassed such that the high-speed side gear 27 and the output shaft 25 integrally rotate and the high-speed side gear 27 is linked with the output shaft 25, and a releasing state in which the link between the high-speed side gear 27 and the output shaft 25 is released.

Note that the reduction gear equipped with the bearing state detection device according to the present disclosure only has to have an input shaft having an input gear that is a helical gear, an output shaft that is disposed in parallel with the input shaft and is idlably mounted with an output gear (a gear on which helical threads are formed on its outer-circumferential face) that engages with the input gear through a rolling bearing, and a linking mechanism that links the output gear with the output shaft. The reduction gear does not necessarily have to be limited to the two-speed switching reduction gear 100 including a pair of the input gears (22 and 23) and a pair of the output gears (26 and 27) that engage with the input gears (22 and 23) as illustrated in FIG. 1. That is, the reduction gear according to the present disclosure is a reduction gear that only has to have at least one input gear, at least one output gear, and at least one rolling bearing.

Here, the low-speed side gear 26 has a large-diameter part 35 and a small-diameter part 36 that is coaxial to the large-diameter part 35. On the outer-circumferential face of the large-diameter part 35, the above-described helical threads 35a that engage with the low-speed side pinion 22 are formed. To the inner circumferential surface of the large-diameter part 35, a race 29b (an outer ring, see FIGS. 5A and 5B) that constitutes the rolling bearing 29 is fixed. On the inner circumferential surface of the small-diameter part 36 having a diameter smaller than the diameter of the large-diameter part 35, inner helical threads 36a that are engaged with (fit into) outer helical threads 41a of the clutch gear 33, described later, are formed. Note that the portion of the inner helical threads 36a may be a spline (an internal spline), not helical threads. The portion of the outer helical threads 41a of the clutch gear 33 may be a spline (an external spline) that is fit into the internal spline. That is, the portion of the inner helical threads 36a and the portion of the outer helical threads 41a may be splines, not helical threads.

Similarly to the low-speed side gear 26, the high-speed side gear 27 has a large-diameter part 37 and a small-diameter part 38 that is coaxial to the large-diameter part 37. On the outer-circumferential face of the large-diameter part 37, the above-described helical threads 37a that engage with the high-speed side pinion 23 are formed. To the inner circumferential surface of the large-diameter part 37, a race (an outer ring) that constitutes the rolling bearing 30 is fixed. On the inner circumferential surface of the small-diameter part 38 having a diameter smaller than the diameter of the large-diameter part 37, inner helical threads 38a that are engaged with (fit into) outer helical threads 42a of the clutch gear 33, described later, are formed. Note that the portion of the inner helical threads 38a may be a spline (an internal spline), not helical threads. The portion of the outer helical threads 42a of the clutch gear 33 may be a spline (an external spline) that is fit into the internal spline. That is, the portion of the inner helical threads 38a and the portion of the outer helical threads 42a may be splines, not helical threads.

The rotation speed switching mechanism 32 further includes the clutch gear 33 and a manipulating unit 34 that moves the clutch gear 33 in the axial direction of the output shaft 25.

In the output shaft 25, on the outer-circumferential face of the portion between the low-speed side gear 26 and the high-speed side gear 27, an external spline 25a is formed. On the other hand, on the inner circumferential surface of a hole formed at the center part of the clutch gear 33, an internal spline 33a is formed. The internal spline 33a of the clutch gear 33 is movably fit into the external spline 25a of the output shaft 25 along the axial direction.

The clutch gear 33 has a low-speed side clutch gear part 41 and a high-speed side clutch gear part 42. On the outer-circumferential face of the low-speed side clutch gear part 41, the outer helical threads 41a are formed so as to be fit into the inner helical threads 36a of the small-diameter part 36 of the low-speed side gear 26. On the outer-circumferential face of the high-speed side clutch gear part 42, the outer helical threads 42a are formed so as to be fit into the inner helical threads 38a of the small-diameter part 38 of the high-speed side gear 27. Between the low-speed side clutch gear part 41 and the high-speed side clutch gear part 42, a groove 43 is provided.

As illustrated in FIGS. 3 and 4 and other drawings, the manipulating unit 34 that moves the clutch gear 33 in the axial direction includes a switching lever 51 in a predetermined length, a position fixing pin 52 that fixes the switching lever 51, a rotating shaft 53, a pair of arms 54, and a cam follower 55 (a pressing member). The rotating shaft 53 is linked with the end portion of the switching lever 51, extends in the direction orthogonal to the input shaft 21 and the output shaft 25 in the planar view, and tunably attached to the casing 31. The pair of arms 54 are oppositely disposed so as to sandwich the clutch gear 33, and their base end sides are fixed to the rotating shaft 53. The cam follower 55 is attached to the distal end portion of the arm 54 in the state in which the cam follower 55 is disposed in the groove 43 of the clutch gear 33, and the cam follower 55 presses the inner side surface of the groove 43 and moves the clutch gear 33 in the axial direction of the output shaft 25 in switching the gears. Note that the cam follower 55 is in a columnar shape, for example, and rotatably attached to the distal end portion of the arm 54.

Operation of Two-speed Switching Reduction Gear

In the rotation stop state of the input shaft 21, when an operator manipulates the switching lever 51 to turn the pair of arms 54 on the low-speed side gear 26, for example, the clutch gear 33 is pressed by a pair of the cam followers 55, the clutch gear 33 moves from the neutral position to the low-speed side gear 26 side over the output shaft 25, and then the clutch gear 33 is fit into the inside of the small-diameter part 36 of the low-speed side gear 26. Thus, the inner helical threads 36a of the low-speed side gear 26 are engaged with the outer helical threads 41a of the low-speed side clutch gear part 41 of the clutch gear 33. Note that the neutral position means a position at which the clutch gear 33 transmits no rotation to any of the low-speed side gear 26 and the high-speed side gear 27.

After that, the input shaft 21 is rotated by the drive unit, such as an electric motor, and thus the low-speed side gear 26 engaging with the low-speed side pinion 22 rotates, and the clutch gear 33 fit into the low-speed side gear 26 rotates integrally with the output shaft 25. That is, rotation driving force is transmitted from the input shaft 21 to the output shaft 25 at a predetermined reduction ratio.

Note that in the rotation stop state of the input shaft 21, when the operator manipulates the switching lever 51 to turn the pair of arms 54 on the high-speed side gear 27 side, the inner helical threads 38a of the high-speed side gear 27 are engaged with the outer helical threads 42a of the high-speed side clutch gear part 42 of the clutch gear 33. After that, the input shaft 21 is rotated by the drive unit, such as an electric motor, and thus the high-speed side gear 27 engaging with the high-speed side pinion 23 rotates, and the clutch gear 33 fit into the high-speed side gear 27 rotates integrally with the output shaft 25.

Bearing State Detection Device

In the above-described two-speed switching reduction gear 100, in the transmission of power from the input shaft 21 to the output shaft 25, the rolling bearings 29 (or the rolling bearings 30) between the low-speed side gear 26 (or the high-speed side gear 27) and the output shaft 25 rotate integrally with the low-speed side gear 26 (or the high-speed side gear 27) and the output shaft 25. No relative velocity is produced between the races 29b (an inner ring and the outer ring) that constitute the rolling bearing 29 (or the rolling bearing 30). Thus, a rolling element 29a of the rolling bearing 29 (or the rolling bearing 30) keeps in contact with the races 29b at the same places in the state in which a load is applied.

Conventionally, as the abnormality diagnosis of a bearing, there are many cases in which vibrations of the bearing housing (the inner ring and the outer ring) are measured, vibrations at a frequency (a bearing damage frequency) due to an inner ring scratch or an outer ring scratch are monitored, and the presence or absence of an abnormality in the bearing is determined. However, as described above, in the two-speed switching reduction gear 100, since the races 29b (the inner ring and the outer ring) do not relatively rotate in the transmission of power, no bearing damage frequency for use in abnormality determination appears, and no conventional abnormality diagnosis method for a bearing can be applied. Even supposing that the vibrations of the rolling bearing 29 (30) are measured, since the rolling bearing 29 (30) is located in the inside of the low-speed side gear 26 (the high-speed side gear 27), it is difficult to measure the vibrations of the rolling bearing 29 (30). In the present embodiment, in order to solve such a problem, the two-speed switching reduction gear 100 includes a bearing state detection device 100S.

Here, in the above-described two-speed switching reduction gear 100, since the pinion gears (22 and 23) provided on the input shaft 21 and the corresponding gears (26 and 27) provided on the output shaft 25 are helical gears, thrust force (force in the axial direction) is produced in the transmission of power. The bearing state detection device 100S according to the present embodiment detects the state (the degree of damage) of the rolling bearing 29 (30) using a phenomenon in which the gear 26 (27) is tilted due to this thrust force. Since the gear 26 (27) is located on the outer side of the rolling bearing 29 (30) in the radial direction and the diameter is greater than the diameter of the rolling bearing 29 (30), a slight wear of the rolling bearing 29 (30) is expanded as a tilt of the gear 26 (27), and appears as a relatively large displacement (the amount of movement in the axial direction).

First Embodiment

A bearing state detection device 100S according to the present embodiment includes a plurality of displacement sensors 1, 2, 11, and 12 and a data processing unit 5 (a processing unit). Among the plurality of displacement sensors, the displacement sensors 1 and 2 are disposed on the lateral side of a low-speed side gear 26, and the displacement sensors 11 and 12 are disposed on the lateral side of a high-speed side gear 27. To the data processing unit 5 (the processing unit), signals from the displacement sensors 1, 2, 11, and 12 are inputted, and the data processing unit 5 (the processing unit) processes the signals. The plurality of displacement sensors 1, 2, 11, and 12 are disposed opposite to a side surface 26a (27a) of the gear 26 (27) (FIGS. 1 and 5A) at positions at a predetermined distance from the rotation axis of an output shaft 25 in the radial direction, and detect a displacement (an amount of movement during a predetermined period) of the side surface 26a (27a) in the axial direction. On the lateral side of one gear 26 (27), at least two displacement sensors are disposed at positions different from each other. Note that in the case in which one of rolling bearings 29 and 30 is not a target for state detection, it is unnecessary to dispose the displacement sensors 1 and 2 (or 11 and 12) on the bearing that is not a target for state detection. That is, the displacement sensors only have to be disposed on the lateral side of at least one of the low-speed side gear 26 and the high-speed side gear 27. The data processing unit 5 operates the tilt amount of the side surface 26a (27a) to the rotation axis of the output shaft 25 based on the displacement detected by the plurality of displacement sensors 1 and 2 (11 and 12) in the rotation of the low-speed side gear 26 (the high-speed side gear 27) linked with the output shaft 25 by a rotation speed switching mechanism 32, and detects the state of the bearing 29 (30) from the tilt amount.

As the displacement sensors 1, 2, 11, and 12, non-contact displacement sensors, such as eddy current displacement sensors, ultrasonic wave displacement sensors, optical displacement sensors, and electrostatic capacitance displacement sensors, are used. The displacement sensors 1, 2, 11, and 12 are screwed types, for example, and fixed to a casing 31 by being screwed into a hole formed on the casing 31.

Hereinafter, a method of detecting the state of the bearing (the rolling bearing) will be described more in detail. Note that since the state detection of the rolling bearing 29 on the low-speed side using the displacement sensors 1 and 2 and the state detection of the rolling bearing 30 on the high-speed side using the displacement sensors 11 and 12 have the same configurations and the same method, the state detection of the rolling bearing 29 on the low-speed side using the displacement sensors 1 and 2 will be described as representative state detection.

The two displacement sensors 1 and 2 according to the present embodiment are disposed, being spaced to each other at an angle of 180° about the axis of the output shaft 25 (along the rotation direction of the output shaft 25). In the present embodiment, the direction in which the two displacement sensors 1 and 2 opposed to each other are connected and the direction in which (the center of) the low-speed side pinion 22 is connected to (the center of) the low-speed side gear 26 are the same directions when viewed from the direction in parallel with the rotation axis of the output shaft 25.

Figure 5A:
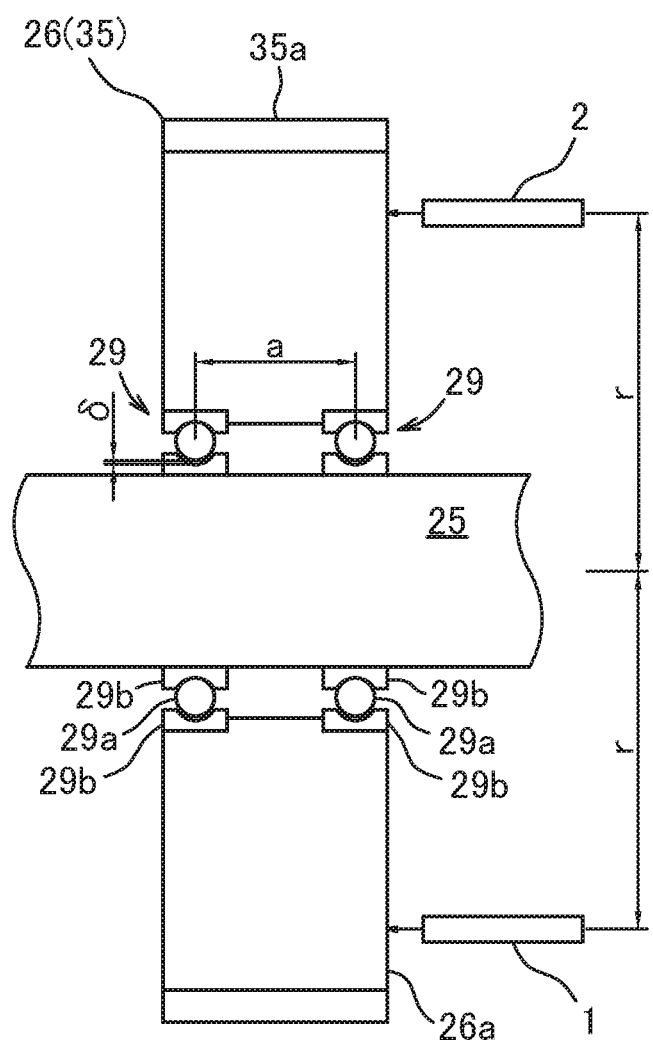
Figure 5B:
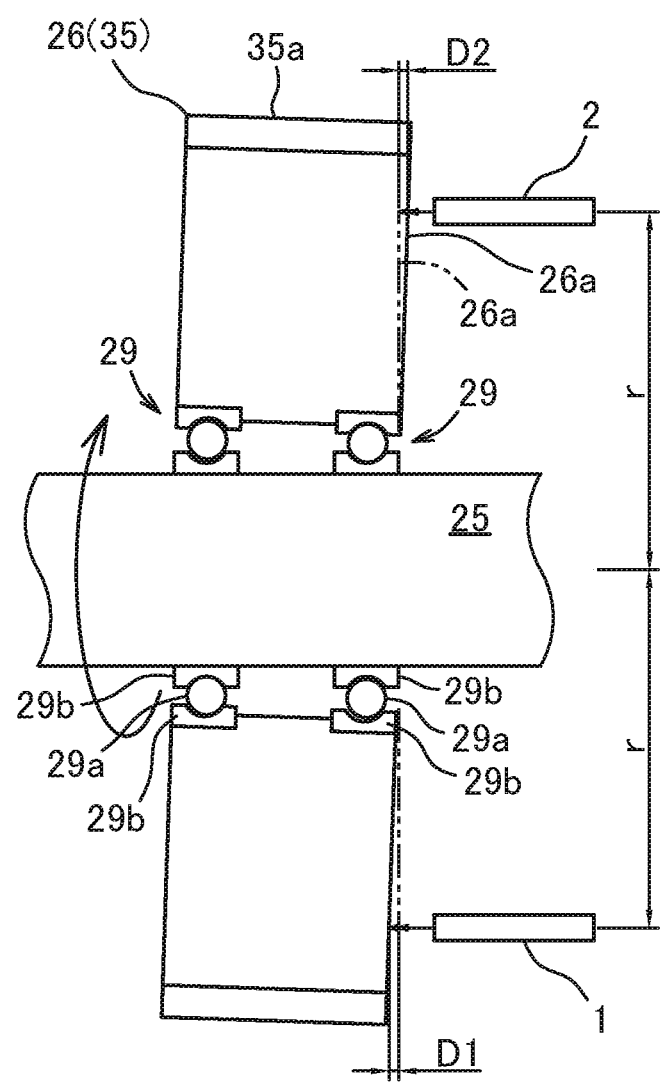
FIG. 5B is a view schematically illustrating a state in which a low-speed side output gear rotates being tilted due to the clearance δ illustrated in FIG. 5A and thrust force acting on the low-speed side output gear in the transmission of power.

Here, FIG. 5A is a view schematically illustrating a clearance δ (a clearance amount) between a race 29b and a rolling element 29a of the rolling bearing 29 produced due to wear or the like. FIG. 5B is a view schematically illustrating a state in which the low-speed side gear 26 rotates being tilted due to the clearance δ illustrated in FIG. 5A and thrust force acting on the low-speed side gear 26 in the transmission of power.

As illustrated in FIG. 5B, the displacement sensors 1 and 2 are disposed in the radial direction from the center (the rotation axis) of the output shaft 25, for example, such that the displacement sensors 1 and 2 can detect the displacement (the amount of movement) of the side surface 26a of the low-speed side gear 26 in the axial direction at a position at a distance r. Note that a distance from the output shaft 25 to the displacement sensor 1 and a distance from the output shaft 25 to the displacement sensor 2 may be different.

A long dashed double-short dashed line illustrated in FIG. 5B shows the position of the side surface 26a of the rotating low-speed side gear 26 in the early stage of the operation after the reduction gear is assembled (in the initial state in which wear or the like is not produced specifically on the rolling bearing 29) in the state in which the low-speed side gear 26 is linked with the output shaft 25 by the rotation speed switching mechanism 32. At the displacement sensors 1 and 2, the position (the reference position) of the side surface 26a of the rotating low-speed side gear 26 at this time is measured, and the data processing unit 5 stores the measured value as a reference value.

In the continuous use of the reduction gear, the clearance δ between the race 29b and the rolling element 29a of the rolling bearing 29 is increasing due to wear or the like. The displacement sensors 1 and 2 detect the position of the side surface 26a of the rotating low-speed side gear 26 in the state in which the low-speed side gear 26 is linked with the output shaft 25 by the rotation speed switching mechanism 32 to the reference position in the early stage of the operation, i.e., the amount of movement (the displacement) in the axial direction of the side surface 26a of the low-speed side gear 26. D1 illustrated in FIG. 5B is the amount of movement (the displacement) detected by the displacement sensor 1, and D2 illustrated in FIG. 5B is the amount of movement (the displacement) detected by the displacement sensor 2.

Note that since the displacement sensors 1 and 2 measure distances between the sensor parts of the displacement sensors 1 and 2 and measurement points, D1 and D2 are determined from arithmetic operations at the data processing unit 5. The displacements (the amounts of movement) detected by the displacement sensors 1 and 2 also include the whirling component of the low-speed side gear 26 corresponding to the rotation of the output shaft 25. The data processing unit 5 executes averaging processing in order to reduce the influence of this whirling component, the mean value of the detected displacements is stored at the data processing unit 5, and the mean value is used in arithmetic operations.

Here, as illustrated in FIG. 5A, when the distance between the centers of two rolling bearings 29 disposed between the output shaft 25 and the low-speed side gear 26 is a, the relationship of Expression 1 below is held among a, δ, D1, and D2.

$$(D1+D2)/2r \approx 2\delta/a \quad \text{(Expression 1)}$$

$(D1+D2)/2r$ is the tilt amount of the low-speed side gear 26. The data processing unit 5 determines the tilt amount of the low-speed side gear 26=$(D1+D2)/2r$ by arithmetic operations based on the amounts of movement D1 and D2 detected by the displacement sensors 1 and 2 in the rotation of the low-speed side gear 26 in the state in which the low-speed side gear 26 is linked with the output shaft 25 by the rotation speed switching mechanism 32.

When the tilt amount $((D1+D2)/2r)$ of the low-speed side gear 26 is i, the clearance δ is expressed by Expression 2 below from (Expression 1) described above.

$$\delta = i \times a/2 \quad \text{(Expression 2)}$$

The data processing unit 5 further estimates the clearance δ (the clearance amount) between the race 29b and the rolling element 29a of the rolling bearing 29 by arithmetic operations by (Expression 2) described above based on the tilt amount i determined by arithmetic operations. Note that in the case in which the clearance δ is produced only on the rolling bearing 29 on one side of the two rolling bearings 29 disposed between the output shaft 25 and the low-speed side gear 26, δ=i×a.

By the method, the data processing unit 5 detects the state of the rolling bearing 29 by periodically estimating the clearance δ. For example, in the case in which the estimated clearance δ greatly changes so as to exceed predetermined threshold, the data processing unit 5 determines that the state of the rolling bearing 29 is in an abnormality, and outputs a signal relating to bearing abnormality information. The signal is inputted to a display unit of the two-speed switching reduction gear 100 or a machine equipped with the reduction gear, and is displayed such that an operator is visually recognizable of the signal. Note that the determination of an abnormality in the state of the rolling bearing 29 may be automatically performed by the data processing unit 5 or the like, or may be performed by the operator periodically checking information on the clearance δ outputted from the data processing unit 5. In this case, the value of the operated clearance δ is outputted by the data processing unit 5, and displayed on the display unit.

Note that the clearance δ and the tilt amount i of the low-speed side gear 26 is in a one-to-one relationship. Therefore, the data processing unit 5 can grasp the state of the rolling bearing 29 only by determining the tilt amount i of the low-speed side gear 26 by arithmetic operations in omission of estimation of the clearance δ by arithmetic operations. That is, the estimation of the clearance δ (the clearance amount) between the race 29b and the rolling element 29a at the data processing unit 5 by arithmetic operations does not necessarily have to be required, and the data processing unit 5 may grasp the state of the rolling bearing 29 based on the tilt amount i of the low-speed side gear 26. However, estimation based on the clearance δ is more preferable than the tilt amount i because the estimation directly expresses the state of the bearing 29.

In accordance with the two-speed switching reduction gear 100 equipped with the bearing state detection device 100S according to the present embodiment, even the state of the rolling bearing 29 (30) that does not relatively rotate in the transmission of power and that is difficult to be directly observed can be grasped.

In the present embodiment, two displacement sensors are used for one gear (26 and 27), this provides a simpler configuration and no complicated arithmetic operations are required in the data processing unit 5, compared with the case in which three or more displacement sensors are used.

In the present embodiment, the direction in which the two displacement sensors 1 and 2 are connected and the direction in which the low-speed side pinion 22 is connected to the low-speed side gear 26 are the same directions (this is similarly applied to the displacement sensors 11 and 12). Here, on the line connecting the low-speed side pinion 22 to the low-speed side gear 26, engagement parts of the gears are present, thrust force is produced at these engagement parts, and the low-speed side gear 26 is tilted due to the thrust force. Thus, according to measurement by the configuration, the amounts of movement detected by the displacement sensors 11 and 12 easily became relatively large, and the tilt amount of the low-speed side gear 26 acquired by the data processing unit 5 also easily becomes large. Thus, noise components due to the whirling phenomenon or the like of the gear is easily cancelled, and the state of the rolling bearing 29 can be more accurately detected.

Note that the low-speed side gear 26 tends to tilt to the direction in which the low-speed side pinion 22 is connected to the low-speed side gear 26. However, it is not possible to say that the tilt amount in the direction is at the maximum for any reduction gear. The direction in which the tilt amounts of the low-speed side gear 26, the high-speed side gear 27, and any other gear is determined depending on the shape of a reduction gear, an acting load, and the like. Therefore, in order to more improve detection accuracy, more preferably, the disposition of the two displacement sensors 1 and 2 opposed to each other is the disposition such that the tilt amount of the low-speed side gear 26 is at the maximum based on experiments, performances in the past, or analysis.

Preferably, the measurement positions of the displacement sensors 1 and 2 are positions close to the outer circumference of the side surface 26a of the low-speed side gear 26 as much as possible. In other words, the measurement positions of the displacement sensors 1 and 2 are desirably disposed at positions closer to the maximum outer diameter part of the side surface 26a of the low-speed side gear 26 than to the minimum outer diameter part. In this case, since a greater amount of movement is detected, the tilt of the side surface 26a of the low-speed side gear 26 can be highly accurately detected.

Further Estimation Method for Clearance $\delta$

In the embodiment, the data processing unit 5 estimates the clearance $\delta$ (the clearance amount) between the race 29b and the rolling element 29a of the rolling bearing 29 by arithmetic operations based on the tilt amount i determined by arithmetic operations. As an estimation method for the clearance $\delta$, it is also preferable to estimate the clearance $\delta$ from an estimation result from the tilt amount i and an estimation result different from the estimation result from the tilt amount i.

Specifically, the data processing unit 5 temporarily stores the clearance amount estimated by arithmetic operations based on the tilt amount i as a clearance $\delta 1$. On the other hand, the data processing unit 5 estimates a clearance $\delta 2$ by arithmetic operations based on the mean value of the above-described displacements (the amounts of movement during a predetermined period in the axial direction) detected by the displacement sensors 1 and 2. The data processing unit 5 compares the clearance $\delta 1$ with the clearance $\delta 2$, and selects a larger clearance (the clearance amount) as the clearance $\delta$ (the clearance amount) for detecting the state of the rolling bearing 29.

That is, the data processing unit 5 estimates the clearance $\delta 1$ (the clearance amount) by arithmetic operations based on the tilt amount i determined by arithmetic operations, estimates the clearance $\delta 2$ (the clearance amount) by arithmetic operations based on the mean value of the amounts of movement detected by the displacement sensors 1 and 2, and determines larger clearance amount of the clearances $\delta 1$ and $\delta 2$ estimated by these two methods as the clearance amount of the rolling bearing 29.

Depending on the load conditions, a change produced due to the clearance of the rolling bearing 29 sometimes more noticeably appears in the amount of movement of the low-speed side gear 26 in the axial direction than in the tilt of the low-speed side gear 26. Therefore, in the comparison of the clearance $\delta 1$ with the clearance $\delta 2$, the determination of a larger clearance (clearance amount) as the clearance $\delta$ (the clearance amount) of the rolling bearing 29 is safer as the grasp of the state of the bearing.

The rolling bearing 29 is supposed to be a taper roller bearing, for example. When the contact angle of this taper roller bearing is a and the mean value of the amounts of movement detected by the displacement sensors 1 and 2 is b, the clearance $\delta 2 = b \times \tan \alpha$.

Second Embodiment

Figure 6:
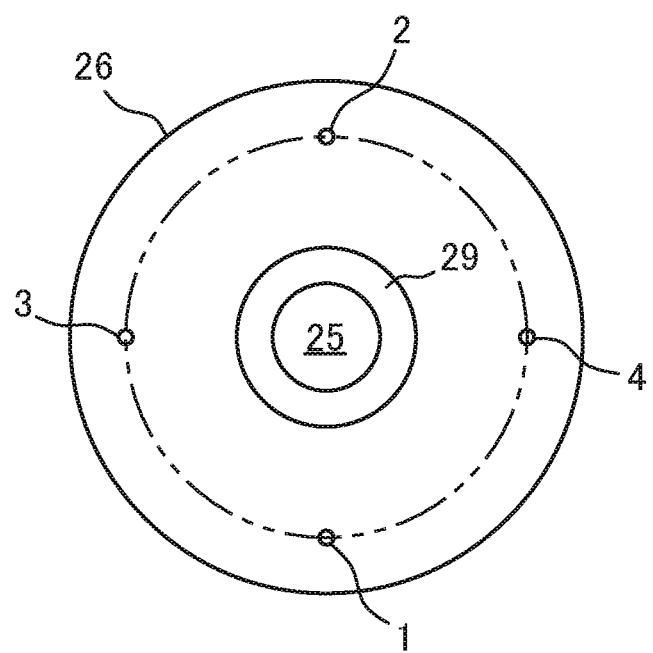
FIG. 6 is a schematic view of the low-speed side output gear viewed from an axial direction, illustrating a state in which four displacement sensors are disposed on the lateral side of the low-speed side output gear.

In the first embodiment, the two displacement sensors 1 and 2 (11 and 12) are disposed on the lateral side of the gear (26 and 27). Instead of this, four displacement sensors may be disposed on the lateral side of the gear (26 and 27). FIG. 6 illustrates an example in which four displacement sensors 1 to 4 are disposed on the lateral side of a low-speed side gear 26 about the rotation axis of an output shaft 25, being spaced to each other at an angle of 90°. Displacement sensors 1 and 2 and displacement sensors 3 and 4 are disposed opposite to each other with the rotation axis of the output shaft 25 sandwiched.

A data processing unit 5 determines tilt amounts i1 and i2 of the gear in the directions of two right angles by arithmetic operations based on the amount of movement of a side surface 26a of an output gear detected by two pairs of displacement sensors 1 and 2 and 3 and 4 opposed to each other, and combines the determined tilt amounts i1 and i2 in the directions of two right angles by arithmetic operations. Methods of determining the tilt amounts i1 and i2 are the same as the case of the first embodiment. Combining the tilt amount i1 and the tilt amount i2 is determining the root sum square of the tilt amount i1 and the tilt amount i2, for example.

According to the present embodiment, since the tilt amount of the low-speed side gear 26 determined at the data processing unit 5 easily becomes large, the state of the rolling bearing 29 can be highly accurately detected.

In the present embodiment, four displacement sensors are disposed on a concentric circle about the rotation axis of the output shaft 25. However, the four displacement sensors do not necessarily have to be disposed on a concentric circle.

Third Embodiment

In the first embodiment, two displacement sensors 1 and 2 (11 and 12) are disposed on the lateral side of the gear (26 and 27), and in the second embodiment, four displacement sensors are disposed on the lateral side of the gear (26 and 27). Instead of this, three displacement sensors may be disposed on the lateral side of the gear (26 and 27).

Figure 7A:
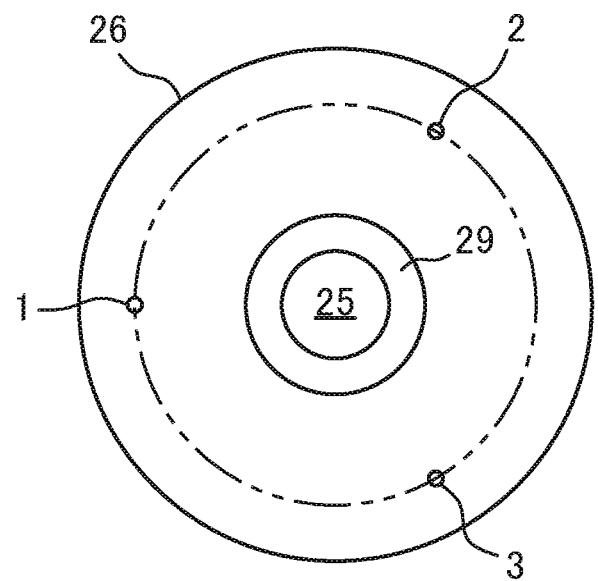
FIG. 7A is a schematic view of the low-speed side output gear viewed from the axial direction, illustrating a state in which three displacement sensors are disposed on the lateral side of the low-speed side output gear.

FIG. 7A illustrates an example in which three displacement sensors 1 to 3 are disposed on the lateral side of a low-speed side gear 26 about the axis of an output shaft 25, being spaced to each other at an angle of 120°.

Figure 7B:
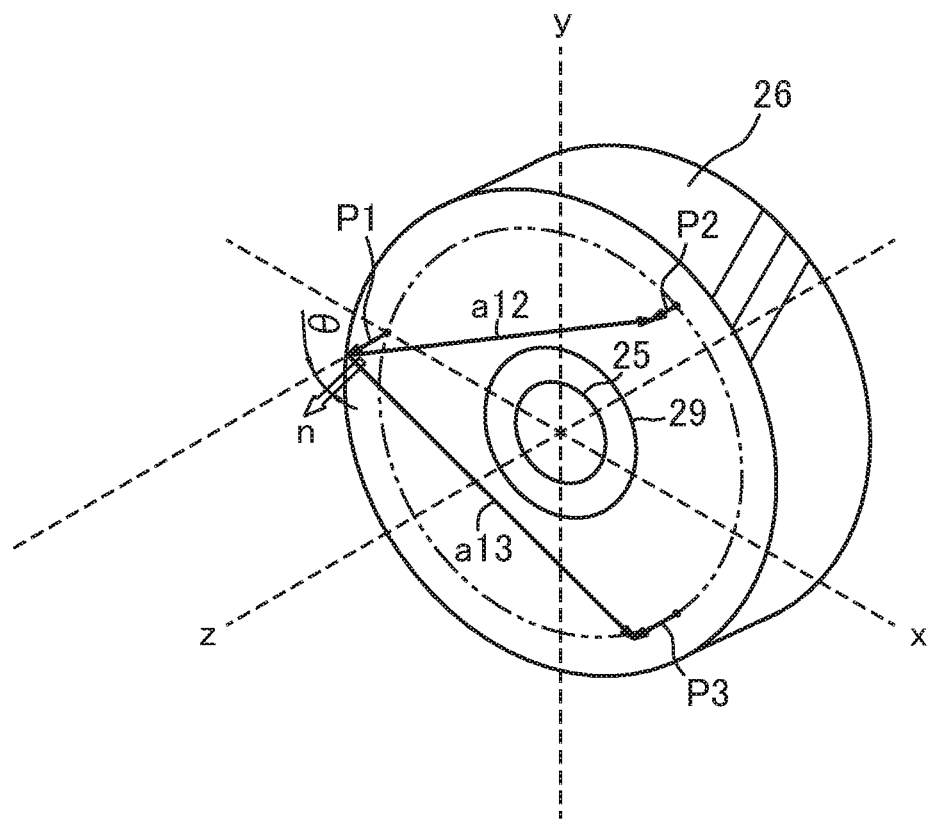
FIG. 7B is a perspective view of the low-speed side output gear, illustrating the amount of change in the measurement position of an output-gear side surface detected by the three displacement sensors illustrated in FIG. 7A with vectors.

Here, FIG. 7B is a perspective view of the low-speed side gear in which the amount of change in the measurement position of the side surface of the gear detected by the three displacement sensors 1 to 3 illustrated in FIG. 7A with vectors. Vectors P1, P2, and P3 are vectors having magnitudes that are the amount of change (the amount of movement) in a side surface 26a of the low-speed side gear 26 in the axial direction detected by the displacement sensors 1, 2, and 3 to the side surface 26a (the reference plane) of the rotating low-speed side gear 26 in the early stage of the operation described above.

The components of vectors P1, P2, and P3 in x-, y-, and z-directions are respectively written in P1 (x1, y1, z1), P2 (x2, y2, z2), and P3 (x3, y3, z3).

Vector a12=vector P2−vector P1=(x2−x1, y2−y1, z2−z1), vector a13=vector P3−vector P1=(x3−x1, y3−y1, z3−z1) is held, and normal vector n on a plane including P1, P2, and P3 is determined as in Expression 3 below by an outer product of vector a12 and vector a13.

Normal vector $n$=vector $a12$×vector $a13$=$((y2-y1)\times(z3-z1)-(y3-y1)\times(z2-z1), (x3-x1)\times(z2-z1)-(x2-x1)\times(z3-z1), (x2-x1)\times(y3-y1)-(y2-y1)\times(x3-x1))$ (Expression 3)

The tilt θ (=the tilt amount of the low-speed side gear 26) of normal vector n to the Z-axis is determined by Expression 4 below based on the calculation of an inner product.

Supposing that $z$ vector is (0,0,1), $\cos\theta = n\cdot z/|n||z| = [(x2-x1)\times(y3-y1)-(y2-y1)\times(x3-x1)]/|n|$ (Expression 4).

The data processing unit 5 performs the arithmetic operation, and determines the tilt θ (the tilt amount) of the low-speed side gear 26.

Note that in the case in which the clearance δ is produced in both of the rolling bearings 29 in the two rolling bearings 29 disposed between the output shaft 25 and the low-speed side gear 26, δ (the clearance amount)=a/2×tan θ is held, whereas in the case in which the clearance δ is produced on only one side of the rolling bearings 29, δ (the clearance amount)=a×tan θ is held. The data processing unit 5 performs the arithmetic operation, and estimates δ (the clearance amount).

In the present embodiment, the three displacement sensors are disposed on the concentric circle about the rotation axis of the output shaft 25 at regular intervals (120° spacing). However, three displacement sensors do not necessarily have to be disposed on the concentric circle at regular intervals. Note that the three displacement sensors are disposed on the concentric circle about the rotation axis of the output shaft 25 at regular intervals (120° spacing), and thus measured accuracy is improved.

As described above, the embodiments of the present disclosure are described. Note that in addition, the present disclosure can be variously modified in the scope that is assumed by a person skilled in the art.

The present disclosure is to provide is a reduction gear. The reduction gear includes a casing, an input shaft that is rotatably supported on the casing, at least one input gear that is fixed to the input shaft, and that rotates together with the input shaft, an output shaft that is rotatably supported on the casing such that the output shaft is disposed in parallel with the input shaft, at least one rolling bearing including an inner ring that is fixed to the output shaft and an outer ring that is relatively rotatable to the inner ring, at least one output gear that is fixed to the outer ring of the at least one rolling bearing and that engages with the at least one input gear, a linking mechanism that bypasses the at least one rolling bearing and links the at least one output gear with the output shaft such that the at least one output gear and the output shaft integrally rotate, and a detection device that detects a state of the at least one rolling bearing. The at least one input gear includes an input-gear outer circumferential part on which helical threads are formed, the at least one output gear includes an output-gear outer circumferential part on which helical threads that engage with the helical threads of the input-gear outer circumferential part are formed, and an output-gear side surface that is orthogonal to an axial direction of the output shaft, and the detection device includes a plurality of displacement sensors that are opposed to the output-gear side surface of the at least one output gear at a position at a predetermined distance from a rotation axis of the output shaft in a radial direction, and that detect a displacement of the output-gear side surface in the axial direction, and a processing unit that acquires a tilt amount to the rotation axis of the output-gear side surface based on the displacements of the output-gear side surface detected by the plurality of displacement sensors in rotation of the output gear that is linked with the output shaft by the linking mechanism.

In the configuration, desirably, the plurality of displacement sensors include four displacement sensors that are disposed, being spaces to each other at an angle of 90° about the rotation axis of the output shaft, and the processing unit operates the tilt amounts of the output-gear side surface in directions of two right angles based on the displacement of the output-gear side surface detected by two pairs of displacement sensor pairs that are opposed to each other, sandwiching the rotation axis among the four displacement sensors and combines the operated tilt amounts in the directions of two right angles.

In the configuration, the plurality of displacement sensors may include three displacement sensors that are disposed about the rotation axis of the output shaft, being spaced to each other, and the processing unit may operate the tilt amount of the output-gear side surface based on the displacements of the output-gear side surface detected by the three displacement sensors.

In the configuration, the three displacement sensors may be disposed about the rotation axis of the output shaft, being spaced to each other at an angle of 120°.

In the configuration, desirably, the plurality of displacement sensors include two displacement sensors disposed about the rotation axis of the output shaft, being spaced to each other at an angle of 180°, and a direction in which the two displacement sensors are connected and a direction in which the input gear is connected to the output gear viewed from a direction in parallel with the rotation axis of the output shaft.

In the configuration, desirably, the rolling bearing further includes a rolling element that is disposed between the inner ring and the outer ring, and the processing unit estimates a clearance amount between the inner ring or the outer ring of the rolling bearing and the rolling element based on the tilt amount of the output-gear side surface.

In the configuration, desirably, the rolling bearing further includes a rolling element that is disposed between the inner ring and the outer ring, and the processing unit estimates a clearance amount between the inner ring or the outer ring of the rolling bearing and the rolling element based on the tilt amount of the output-gear side surface, on one hand, estimates the clearance amount based on a mean value of the displacements of the output-gear side surface detected by the plurality of displacement sensors, and selects a larger clearance amount from the two estimated clearance amounts as the clearance amount that is final.

In the configuration, desirably, the at least one input gear includes a low-speed side input gear and a high-speed side input gear, the at least one output gear includes a low-speed side output gear that engages with the low-speed side input gear and a high-speed side output gear that engages with the high-speed side input gear, the linking mechanism selectively links one of the low-speed side output gear and the high-speed side output gear with the output shaft, and the plurality of displacement sensors are disposed opposite to the output-gear side surface of at least one output gear of the low-speed side output gear and the high-speed side output gear.

The invention claimed is:

1. A reduction gear comprising:
  a casing;
  an input shaft that is rotatably supported on the casing;
  at least one input gear that is fixed to the input shaft, and that rotates together with the input shaft;
  an output shaft that is rotatably supported on the casing such that the output shaft is disposed in parallel with the input shaft;
  at least one rolling bearing including an inner ring that is fixed to the output shaft and an outer ring that is relatively rotatable to the inner ring;
  at least one output gear that is fixed to the outer ring of the at least one rolling bearing and that engages with the at least one input gear;
  a linking mechanism that bypasses the at least one rolling bearing and links the at least one output gear with the output shaft such that the at least one output gear and the output shaft integrally rotate; and
  a detection device that detects a state of the at least one rolling bearing, wherein:
  the at least one input gear includes an input-gear outer circumferential part on which helical threads are formed;
  the at least one output gear includes
    an output-gear outer circumferential part on which helical threads that engage with the helical threads of the input-gear outer circumferential part are formed, and
    an output-gear side surface that is orthogonal to an axial direction of the output shaft; and
  the detection device includes
    a plurality of displacement sensors that are opposed to the output-gear side surface of the at least one output gear at a position at a predetermined distance from a rotation axis of the output shaft in a radial direction, and that detect a displacement of the output-gear side surface in the axial direction, and
    a processing unit that acquires a tilt amount to the rotation axis of the output-gear side surface based on the displacements of the output-gear side surface detected by the plurality of displacement sensors in rotation of the output gear that is linked with the output shaft by the linking mechanism.

2. The reduction gear according to claim 1, wherein: the plurality of displacement sensors include four displacement sensors that are disposed, being spaces to each other at an angle of 90° about the rotation axis of the output shaft; and
the processing unit operates the tilt amounts of the output-gear side surface in directions of two right angles based on the displacement of the output-gear side surface detected by two pairs of displacement sensor pairs that are opposed to each other, sandwiching the rotation axis among the four displacement sensors and combines the operated tilt amounts in the directions of two right angles.

3. The reduction gear according to claim 1, wherein: the plurality of displacement sensors include three displacement sensors that are disposed about the rotation axis of the output shaft, being spaced to each other; and
the processing unit operates the tilt amount of the output-gear side surface based on the displacements of the output-gear side surface detected by the three displacement sensors.

4. The reduction gear according to claim 3, wherein the three displacement sensors are disposed about the rotation axis of the output shaft, being spaced to each other at an angle of 120°.

5. The reduction gear according to claim 1, wherein: the plurality of displacement sensors include two displacement sensors disposed about the rotation axis of the output shaft, being spaced to each other at an angle of 180°; and
a direction in which the two displacement sensors are connected and a direction in which the input gear is connected to the output gear viewed from a direction in parallel with the rotation axis of the output shaft are the same directions.

6. The reduction gear according to claim 1, wherein: the rolling bearing further includes a rolling element that is disposed between the inner ring and the outer ring; and
the processing unit estimates a clearance amount between the inner ring or the outer ring of the rolling bearing and the rolling element based on the tilt amount of the output-gear side surface.

7. The reduction gear according to claim 1, wherein: the rolling bearing further includes a rolling element that is disposed between the inner ring and the outer ring; and
the processing unit estimates a clearance amount between the inner ring or the outer ring of the rolling bearing and the rolling element based on the tilt amount of the output-gear side surface, on one hand, estimates the clearance amount based on a mean value of the displacements of the output-gear side surface detected by the plurality of displacement sensors, and selects a larger clearance amount from the two estimated clearance amounts as the clearance amount that is final.

8. The reduction gear according to claim 1, wherein: the at least one input gear includes a low-speed side input gear and a high-speed side input gear;
the at least one output gear includes a low-speed side output gear that engages with the low-speed side input gear and a high-speed side output gear that engages with the high-speed side input gear;
the linking mechanism selectively links one of the low-speed side output gear and the high-speed side output gear with the output shaft; and
the plurality of displacement sensors are disposed opposite to the output-gear side surface of at least one output gear of the low-speed side output gear and the high-speed side output gear.

* * * * *